G. A. TICKERHOOF.
RAIL JOINT.
APPLICATION FILED APR. 28, 1919.

1,331,293.

Patented Feb. 17, 1920.

WITNESSES:
K. A. Thomas.

INVENTOR
G. A. Tickerhoof
BY
Victor J. Evans
ATTORNEY

UNITED STATES PATENT OFFICE.

GEORGE A. TICKERHOOF, OF SOUTH FORK, PENNSYLVANIA.

RAIL-JOINT.

1,331,293.  Specification of Letters Patent.  Patented Feb. 17, 1920.

Application filed April 28, 1919. Serial No. 293,057.

*To all whom it may concern:*

Be it known that I, GEORGE A. TICKERHOOF, a citizen of the United States, residing at South Fork, in the county of Cambria and State of Pennsylvania, have invented new and useful Improvements in Rail-Joints, of which the following is a specification.

This invention relates to a novel construction of rail joints, and the principal object of the invention is to provide means for holding the ends of the rails together without the use of bolts and the like.

Another object of the invention is to connect the two fish plates together at their bottoms so as to form a socket for receiving the ends of the rails, with means for locking the said ends in said socket.

Another object of the invention is to provide means for permitting the connected fish plates to have sliding movement on one rail to free the other rail and a wedge member for preventing this movement for locking the rails and plates together.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
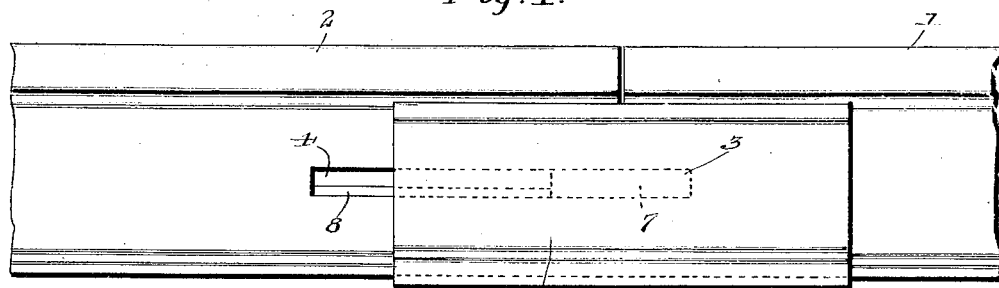
Figure 1 is a side view of the improved joint.
Figure 2:
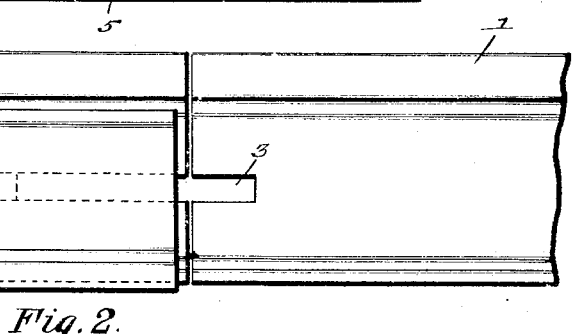
Fig. 2 is a like view with the parts in position permitting the removal of one of the rails.
Figure 3:
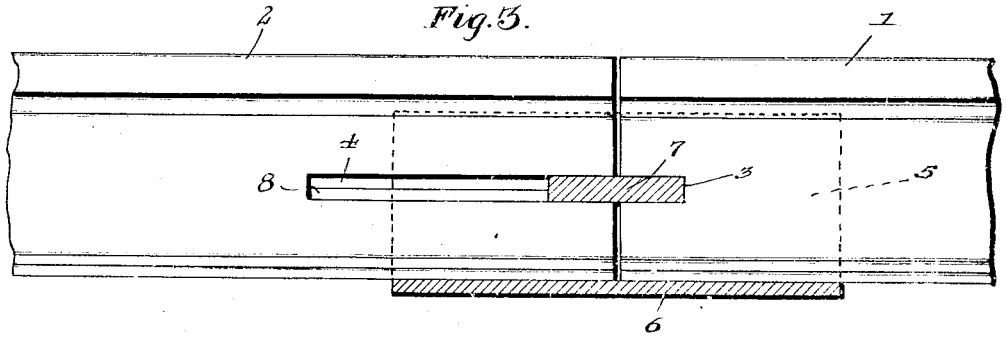
Fig. 3 is a side view with one fish plate removed.
Figure 4:
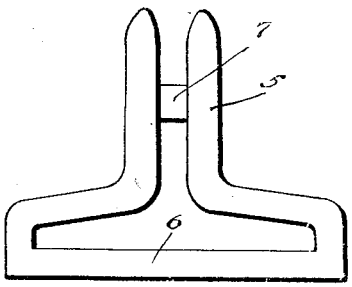
Fig. 4 is an end view of the connected fish plates.

In these views, 1 indicates a portion of one rail and 2 a portion of the other rail. The rail 1 is provided with a transverse slot 3 in the end of its web, while the rail 2 is provided with a like slot 4, but this slot is of greater length than the slot 3. The fish plates 5 are formed to fit the web and inclined parts of the base of the rails, and the bottom edges of the plates are connected together by the plate 6. Thus the fish plates and said bottom plate form a socket member to receive the ends of the rails, said member being slidable on the rail. A crosspiece or block 7 bridges the space between the vertical parts of the fish plates. This block is centrally arranged, both with respect to the ends of the plates and the edges of the vertical parts thereof. The block is of such length that when the rail 1 is slid in place, one end of the block will enter the slot 3, and when this end engages with the end wall of the slot the end of rail 1 will lie midway the ends of the fish plates. Thus further movement of the fish plates on the rail 1 will be prevented. However, the fish plates may slide on rail 2 until the end of the rail will slightly project beyond the ends of the fish plate, due to the length of the slot 4, which is engaged by the block 7. When the parts are in this position it will be seen that either rail can be removed without interference on the part of the fish plates. After the rails are in proper position and the fish plates are in engagement with both rails so as to hold said rails together, a key strip 8 is placed in the slot 4 with one end engaging the end of the crosspiece and its other end engaging the end wall of said slot 4. Thus the fish plates are held locked against movement and the rails held with their ends in alinement. When it is desired to remove the rails the key strip is forced out of the slot, so that the fish plates may be slid into full contact with the rail 2 and thus permit the removal of either or both rails.

What I claim is:—

In combination with a pair of rails having their webs provided with end slots, a socket member receiving the ends of the rails and having a cross piece therein engaging the slots and a key strip having one end abutting the end wall of one of said slots for holding the parts in position, said strip lying entirely within the slot.

In testimony whereof I affix my signature.

GEORGE A. TICKERHOOF.